(12) United States Patent
Simon et al.

(10) Patent No.: US 6,266,338 B1
(45) Date of Patent: Jul. 24, 2001

(54) SYSTEM FOR THE REGULATION OF INFORMATION TRAINS FOR PACKETS

(75) Inventors: Jean Louis Simon, Lannion; Géraldine Calvignac, Pleumeur Bodou; Martine Berthou, Perros Guirec, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 08/752,817

(22) Filed: Nov. 21, 1996

(30) Foreign Application Priority Data

Nov. 23, 1995 (FR) .................................................. 95-13963

(51) Int. Cl.[7] .............................. H04L 12/56; H04L 12/26
(52) U.S. Cl. ............................................. 370/412; 370/230
(58) Field of Search ...................................... 370/224, 230, 370/231, 235, 237, 412, 414, 415, 416, 417, 418, 419, 421, 422, 423, 398, 447, 461, 462, 463

(56) References Cited

U.S. PATENT DOCUMENTS

| | | | |
|---|---|---|---|
| 4,623,996 | * 11/1986 | McMillen | 370/412 |
| 5,001,706 | * 3/1991 | Dighe et al. | 370/412 |
| 5,222,085 | * 6/1993 | Newman | 370/414 |
| 5,267,235 | 11/1993 | Thacker | 370/60 |

OTHER PUBLICATIONS

A General Architecture For Link–Layer Congestion Control In ATM Networks; H. Jonathan Chao, Proceedings of the International Switching Symposium, Oct. 25, 1992, pp. 229–233.

WO 95/11557, Van As, Selective congestin control mechanism for information networks, PCT, Page, Apr. 27, 1995.*

* cited by examiner

Primary Examiner—Wellington Chin
Assistant Examiner—Steven Nguyen
(74) Attorney, Agent, or Firm—Nilles & Nilles SC

(57) ABSTRACT

In a system for the regulation of information trains for packet switches, there is provided one queue per path in each input module liable to be driven by an arbitrator placed in each of the output modules bearing these channels.

19 Claims, 12 Drawing Sheets

THE DIGITS 1 AND 2 MARK THE ORDER
OF THE CELLS WITHIN ONE AND THE
SAME TRAIN

---- CHANNEL OBSERVED WITH
ITS ASSOCIATED BUFFER
AND ITS CREDIT REGISTER

SYSTEM FOR THE REGULATION OF INFORMATION TRAINS FOR PACKETS

BACKGROUND OF THE INVENTION

1. Field of the Invention

The present invention relates to a system for the regulation of information trains for a packet switch.

FIG. 1 shows the schematic diagram of a device for the regulation of information trains within a switch. A device of this kind has chiefly input modules, output modules and a routing module.

To simplify the description, only three input modules and three output modules, respectively referenced E1, E2, E3; S1, S2, S3 have been shown in this figure.

In general, these modules are each made in the form of an electronic card with a standard format.

Each input module receives an information train at its input port. This information train, which is at a high bit rate, may or may not be sporadic.

Each module, namely each input card or output card, has two ports, an input port and an output port. The routing module has at least as many input ports and output ports respectively as it has input cards and output cards respectively.

An input link of the switch forms an input port of an input card.

A port consists of a channel that takes several paths forming an interlacing of information trains, it being known that instantaneously there is only one cell on the channel. Information trains enter asynchronously and exit asynchronously.

After going through an input and output module (or card), the order of the packets in each information train must remain the same.

Reference may be made, for a clearer understanding of the description, to the diagram of FIG. 2, which shows cases of interlacing of information trains flowing through an input card or through an output card.

Indeed, this diagram illustrates the incoming of three information trains at the input port with the bit rate DE card and the exit of these three information trains at the output port with the bit rate DS of the card.

The digits 1 and 2 mark the order of the cells within one and the same train. It can be seen that the order of the packets in each information train is the same at output as it is at input.

With an information train there is associated a bit rate (this is the number of cells per second) which is also the bit rate of the path on which it is moving.

With a port there is associated a bit rate (the borderline value of the number of cells per second independently of the information trains to which these cells belong). The input bit rate DE of an input card is generally equal to the output bit rate DS of this card. It may also be lower.

It will be recalled that the term "active path" for a card is understood to mean a path for which there are cells in this card (this notion of active path is therefore internal to a switch).

The cells are placed on each output link according to a particular rule by distinguishing the paths to which they belong. This particular rule could be for example:
  either in proportion to the bit rates of each pat h,
  or by the equitable sharing of the link between the active paths.

Other rules may be envisaged.

It will also be recalled that it is possible for a communication (for information other than data trains) between switches to be set up in order to adjust the bit rate of the paths between switches.

It is then possible for a switch to send an indication to its upline switch instructing it to reduce the bit rates of the paths coming from the output cards of this upline switch.

An output of the upline switch is then associated with an input card of the switch considered.

Reference may be made to the diagram of FIG. 3 which illustrates this example.

A clearer understanding of the problem posed can be obtained by looking inside a switch. Tijk denotes the information train flowing on the path Tijk coming from the input module i, going towards the output module J, this information train having an index k among the trains having same input modules and same output modules.

The routing module is capable of processing the sum of the incoming bit rates. Its function is to send a data train from a port $\underline{i}$ to a port $\underline{j}$ in following the flow. It is possible that the information trains coming from different input ports will be routed to the same output module.

The constraints of processing time and of storage capacity of the input or output modules are such that the bit rate that a module can accept at input (DE) is limited.

The reference DEe will be applied to the input bit rate of an input module, DEs being that of an output module and DEa that of the routing device.

The reference DSe will be applied to the output bit rate of an input module, DSs to that of an output module and DSa to that of the routing device.

Hereinafter, a distinction shall be made between the case where the routing device is not limited in output bit rate and the case where its output ports and input ports have the same bit rate:

Case A

Even if the routing device were to bear the superimposition of the bit rates of each of the information trains that converge towards the same output port (in having the bit rate of each output port equal to the sum of the bit rates of its input ports: DSa=Σ DEa), the output card is limited by the bit rate DEs that it can accept, DEs<<Σ DEa; a bottleneck thus appears at the input of the output card.

Case B

When the routing card has input and output ports with the same bit rates (DSa=DEa), a buffer of limited size is associated with each output port with the aim of accepting the excess bit rate as compared with DSa, generated by the simultaneity of convergence of sporadic trains.

However, the risk remains that this limited memory capacity will be insufficient to collect the excess of bit rate as compared with DSa, whence the risk of uncontrollable losses in the buffer.

In this case, the problem is shifted from the input of the output card (case A) to the output of the routing device (case B). This is illustrated in the diagram of FIG. 5.

There is therefore a bottleneck. This bottleneck is set up by the routing device.

2. Description of the Prior Art

Hereinafter, the approaches that have been provided to resolve this problem shall be enumerated.

1) The first approach consists in placing a buffer at output of the routing device. Practically, this amounts to placing a large memory at each output port. The memory size is a function of the number of inputs and of the bit rate so as to buffer the excess bit rate at output of the routing device.

In the case A (defined here above), the memories are placed between the output port of the routing device and the output card as shown in FIG. 6.

In the case B, these memories are placed in the routing card at the output port as shown in FIG. 5.

The size of the buffer needed to collect the excess bit rate increases linearly according to the relationship: (n−1)×D×T, with n as the number of inputs of the routing device, D as the bit rate of the input ports of the routing device and of the output port (case B) or of the input of the output card (case A), T the duration during which the simultaneity of convergence occurs.

For eight inputs at 155 M bits per second and 424-bits cells (giving 365 k cells per second) and information trains with a length of 200 cells (the duration of a train being 547 µs), a buffer size of 1,400 cells is needed to collect the bit rate on the duration of a train (547 µs), and increases linearly so long as this simultaneity of convergence continues (for example on several trains).

Thus, the memory sizes needed very soon become substantial, and there is no certainty that the memory size chosen will be sufficient to collect the excess bit rate in every possible example.

Now, having uncontrollable losses is intolerable.

Furthermore, in the case B, when the routing card is taken from among those available in the market, there is no possibility of modifying the memory size within the routing device. This routing device is fixed by the manufacturer (for example the Fujitsu MB86680A matrix has buffers at output with a capacity of 75 cells).

2) The second approach consists in placing a buffer at the input of the routing device and using a resource reservation mechanism.

A buffer is placed at each input of the routing device. The input cards make use of a central unit which has knowledge of all the needs of the switch in terms of bit rate. This central unit adjusts the output bit rates of the buffers in such a way that there is no overflow at output of the routing device. This approach is illustrated in FIG. 7.

The maximum buffer size is no longer: D×T with D as the bit rate from the input port of the input card, T the duration during which the central unit no longer allows this card to transmit (this is the worst case, the central unit having to see to it that the outflow from the buffers takes place as efficiently as possible).

To implement this approach it will be necessary however to add rhythm generators to the buffers in order to carry out the commands of the central unit.

Furthermore, the centralization of the decisions in a single unit is dangerous (if the central unit is defective, the overall operation of the switch is affected).

Furthermore, in the event of a reduction of the bit rate of the buffer owing to the paths leading towards output cards on which there is a simultaneity of convergence of the trains, there is a risk that this system might have a harmful effect on the paths that are borne by the same input cards that go towards the output cards for which there is no simultaneity of convergence.

In order to resolve the latter problem, one approach consists in placing several buffers on each input of the routing device; as many buffers are positioned on each input as there are possible output directions.

A central unit adjusts the output bit rates of the buffers in such a way that there is no overflow at output of the routing device. This is shown in the drawing of FIG. 8.

The drawback of this approach is still the fact that it is necessary to add rhythm generators to carry out the commands of the central unit, as well as the fact that the decisions are centralized in a single unit.

This is a complicated approach to set up and control.

Furthermore, the central unit does not take account of the paths individually and, if it is desired to place the cells at each output link according to a particular rule in distinguishing the paths to which they belong, it is necessary to have a device placed in each output card that arbitrates each of the paths borne by the card. To this arbitration mechanism there is then added the mechanism that regulates the output bit rates of the buffer at input of the routing device.

3) A third and final approach consists in placing a buffer at output of the input cards and in using a credit mechanism.

Buffers are placed on each output of the input card. As many buffers are placed on each output as there are paths borne by the input card.

FIG. 9 illustrates the credit mechanism for each path, between output cards and input cards. This figure shows only the buffer and the credit register associated with a particular path in an input card (in fact there are as many buffers and credit registers as there are paths borne by an input card).

According to this approach, an input card may send out a packet (or cell) belonging to a connection when the credit for this path is not zero.

After the sending of a cell by the input card, the credit value of the path is decremented by 1. After the sending of a cell for this path by the output card, the credit value of the path is incremented by 1.

Thus, each leap through the matrix for a path is managed by a credit algorithm.

One of the useful points here is that there are no additional rhythm generators in the input cards. These cards transmit only when credits are available.

Another useful feature is the independence of the functioning of the different cards. There is no centralized management.

This problem does not completely resolve the problem of jamming or blocking at the output of the routing device. Indeed, should many credits be concentrated in the input cards (this situation may occur when starting but also during normal operation) and should several cards decide simultaneously to use their credits for paths going towards one and the same output card, there will be an overflow of the buffers of the matrix in the case B or saturation of the input of the output card in the case A.

In this case, the excess bit rate which will then have to be collected in the output buffers of the routing device (cf. first approach) is: (n−1)×D with n as the number of inputs that transmit simultaneously, D as the bit rate of the input ports of the routing device and of the output port (case B) or of the input of the output card (case A).

If T is the duration in which the simultaneity of convergence on the output card occurs: T=c×V×1/D, with c as the number of credits, V as the number of paths borne by an input card and going to the same output card (taking the case where the credits within one and the same input card, for the paths going to one and the same output cards, are used successively).

Thus, the memory size needed to collect the excess bit rate is:

$$(n-1) \times D \times c \times V \times 1/D = (n-1) \times c \times V,$$

which represents, for c=3, n=8 and V=300, a considerable size of 7,200 cells (which, especially with respect to the case B, is far greater than the 75 cells provided for in a commercially available routing device).

The size of 7,200 cells corresponds to the result obtained from the relationship defined in the first approach for a period of time T needed to let out 300 trains of 3 cells (3 being the credit value, and not 200 cells).

In the prior art approaches that have been identified, it can be seen that the risks of blocking persist despite considerable memory size placed at output of the routing device (first approach) or smaller-sized buffers at input of the routing device associated with a credit mechanism (third approach).

When the problem of the blocking is resolved, whatever may be the example (second approach), there then arises the question of the control of a highly complex system as well as that of the risk involved in the centralizing of decisions. Furthermore, the latter approach requires an additional arbitration mechanism.

SUMMARY OF THE INVENTION

It is an object of the present invention to resolve these drawbacks. Thus, as compared with the prior art approaches referred to, according to the present invention it is not necessary to add large-sized memories to the output of the routing device. There is no centralized system and a single arbitration unit is implemented in each output card whatever the arbitration rule.

Furthermore, should it be desired to enable communication between switches (for information elements other than the data trains, such as flux regulation commands), this approach facilitates the correspondence between the paths borne by the switch and the upline switches from where they come. During the management of the buffers that are associated with them in the switch, a reverse switching is not necessary as shall be explained hereinafter.

An object of the present invention more particularly is a system for the regulation of information trains for packet switches according to which there is provided one queue per path of each input module liable to be driven by an arbitrator placed in each of the output modules bearing these paths.

An object of the invention therefore is a switch comprising n input modules, each being connected to an input link constituting a transport channel comprising several paths on which there flow information trains consisting of interlaced packets; m output modules and one routing module interposed between the input modules and the output modules to route the information trains flowing on a path k from an input card i towards an output card j, according to a preset rule, wherein chiefly said system comprises:

a) in a first input module, one queue per path that passes into the module, b) in each output module, an arbitrator capable of transmitting packet transmission requests (DE), in the direction of the output module in which it is placed, according to a preset rule, to an input module.

According to a second characteristic, each input module (Ei) comprises a unit capable of transmitting a packet presence or packet absence indication (P/A) for each path borne by this module towards the output modules bearing these paths.

According to another characteristic, the system has a communications bus (BD) for the exchanges of signals (P/A, DE) between input module and output module of the system. This bus directly interconnects all the input modules to all the output modules.

Each input module (Ei) has a set comprising one queue per path, a queue access and management unit capable of transmitting indications on packet presence or packet absence and a packet extraction unit responding to requests for transmission (DE).

The queue access and management unit and the packet extraction unit are implemented with a packet processor associated with a context memory of the paths that sets up a correspondence, with each packet, of its path number and by a unit for the processing of the transmission requests (DE) received and for the generation of indications on packet presence or packet absence (P/A).

The unit for the processing of the transmission requests (DE) and for the generation of indications on packet presence or packet absence (P/A) has a reception and processing device to receive several transmission requests (DE) by order of arrival coming from different output modules. This unit for the processing of the transmission requests (DE) processes a single request (DE) at the output rate (Te) of the input module, from among those received in order to make transmission, to the output port, of a packet belonging to the path associated with the transmission request processed.

The queue access and packet extraction unit further comprises a unit for communications with the dialog bus (BD) to store the transmission requests (DE) that are sent to it and keep the indications of the indications on packet presence or packet absence (P/A) in a pending state so long as the bus is not available.

The communications unit comprises a processor for the management of the dialog bus (BD), two stacks (702), one of which receives the transmission requests (DE) from the different output modules while the other receives the indications on packet presence or packet absence pertaining to each path borne by the input module and a control circuit to compare the information received on the identification of the addressee module with its own identification and thus find out if the dialog bus is available for this input module.

The regulation system furthermore comprises an arbitrator of the dialog bus (BD) entrusted with the task of providing the sequencing signals for the reading and writing operations on this dialog bus.

Each output module (Si) has a packet processor associated with a context memory of the paths, the arbitrator enabling the generation of the transmission requests and the processing of the indications on packet presence or packet absence received according to the preset arbitration rule.

Each output module comprises a communications unit for the dialog with the dialog bus (BD) to memorize the indications on packet presence or packet absence (P/A) that are sent to it by the different input modules and keep the packet transmission requests (DE) addressed to different input modules in a pending state so long as the bus is not available.

The communications unit has two stacks, one of which is used to store the indications on packet presence or packet absence while the other stores the requests for transmission, and a control circuit receiving an information element on the identification of the module and comparing this information element with its own identification to thus find out if the dialog bus is available for this output module.

BRIEF DESCRIPTION OF THE DRAWINGS

Other features and advantages of the present invention shall appear from the following description, given by way of an exemplary illustration that does not limit the scope of the invention, with reference to the appended drawings, of which.

MORE DETAILED DESCRIPTION

Figure 1:
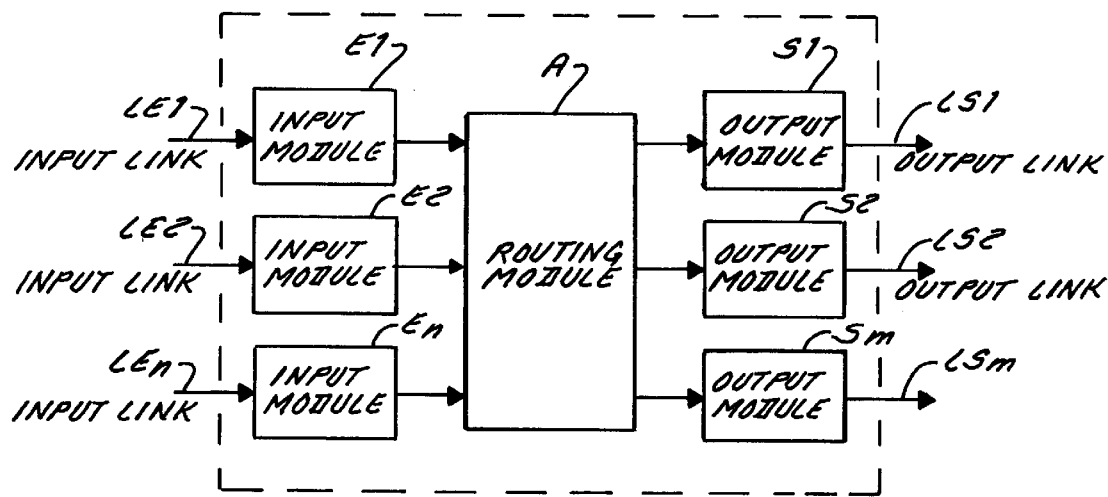
FIGS. 1 to 9 show drawings of regulation systems according to the prior art.
Figure 2:
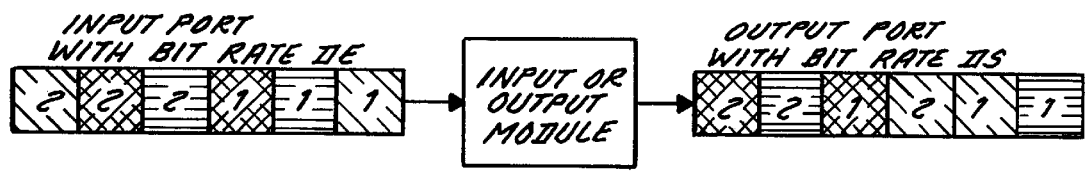
Figure 2:
Figure 3:
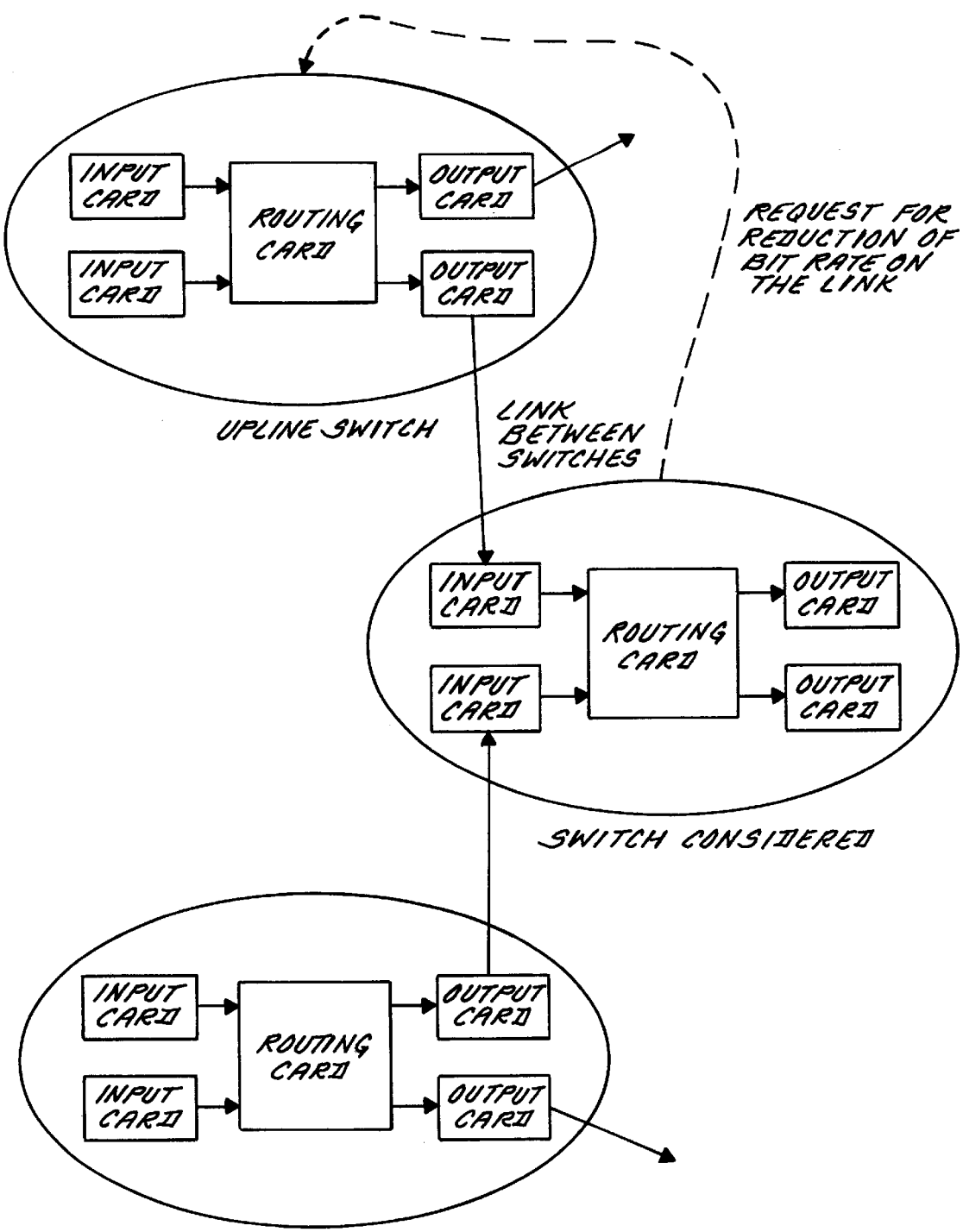
Figure 4:
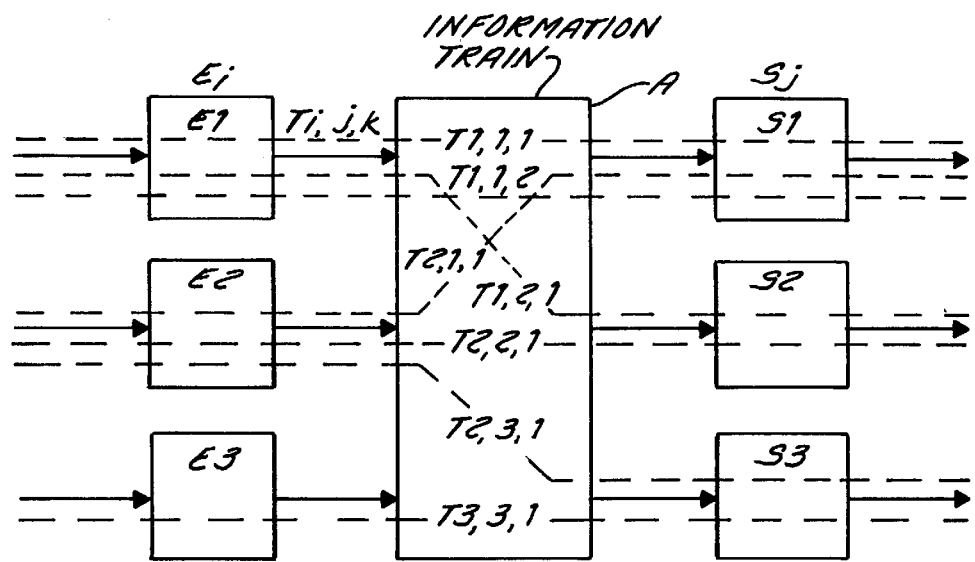
Figure 5:
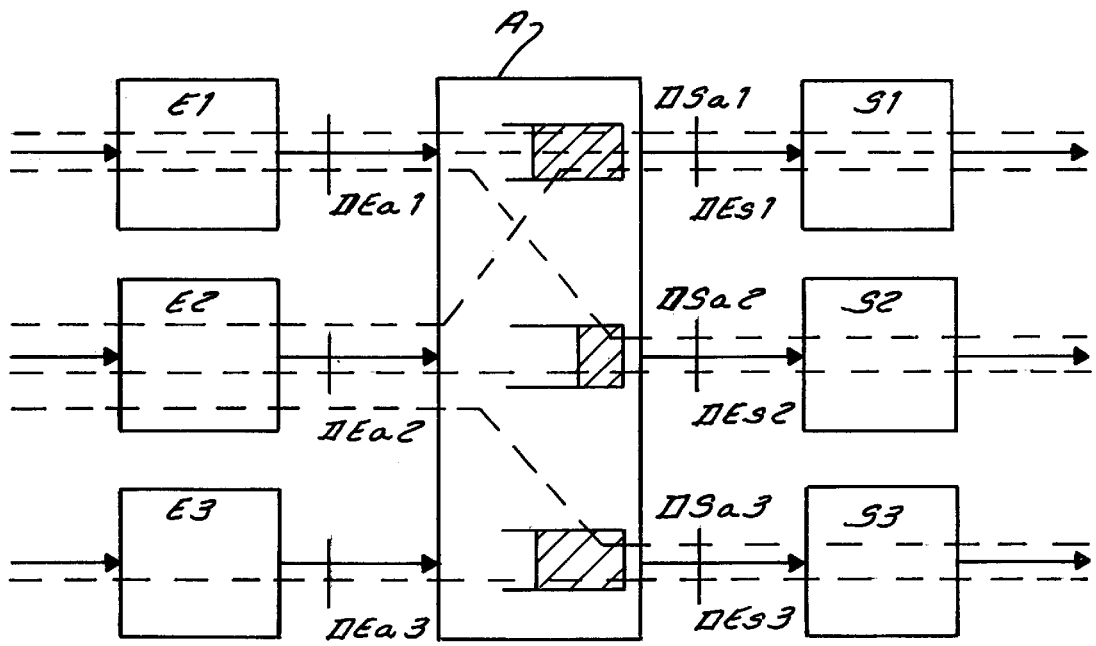
Figure 6:
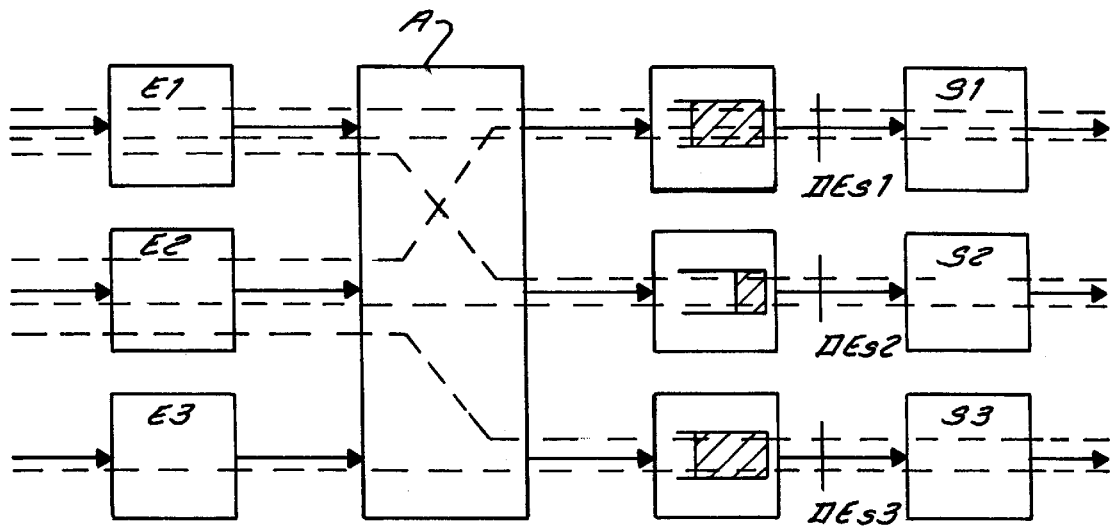
Figure 7:
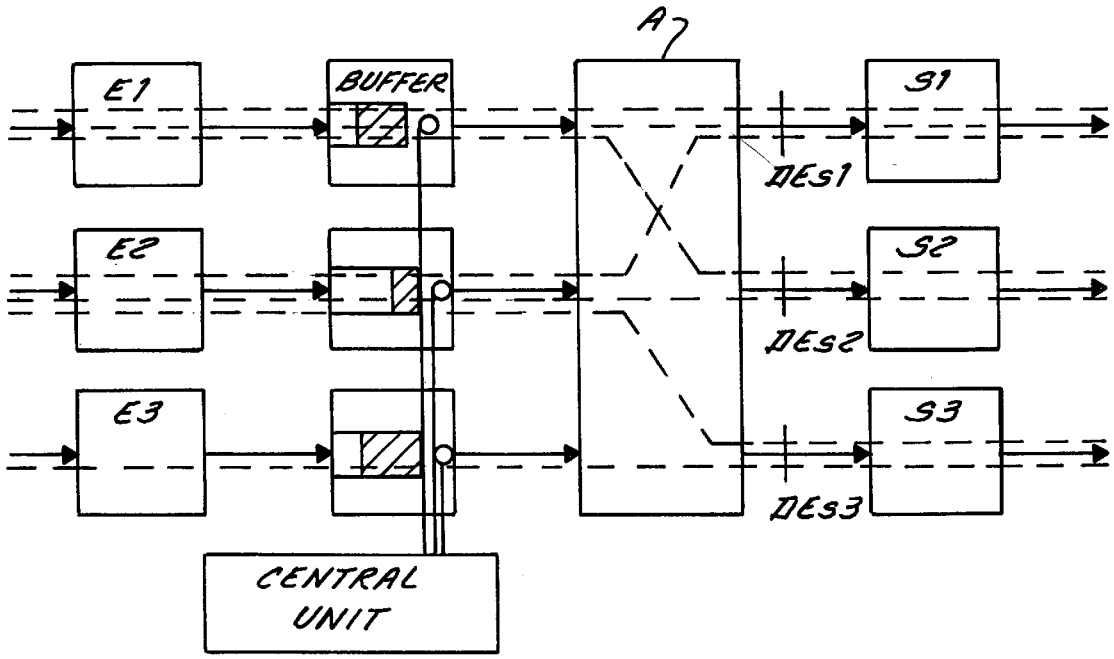
Figure 8:
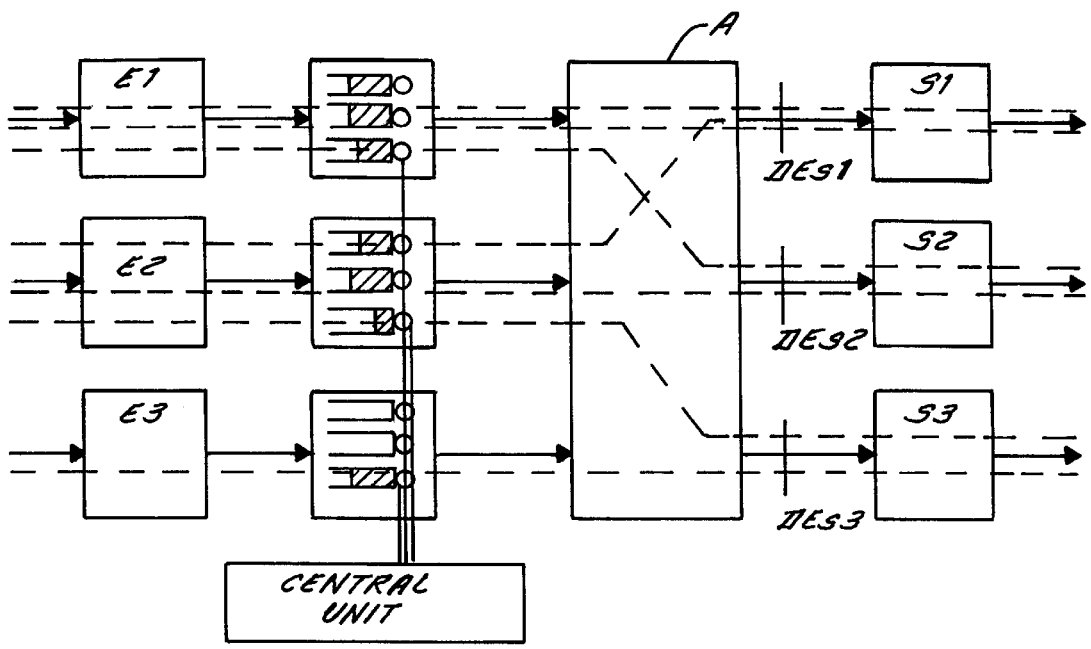
Figure 9:
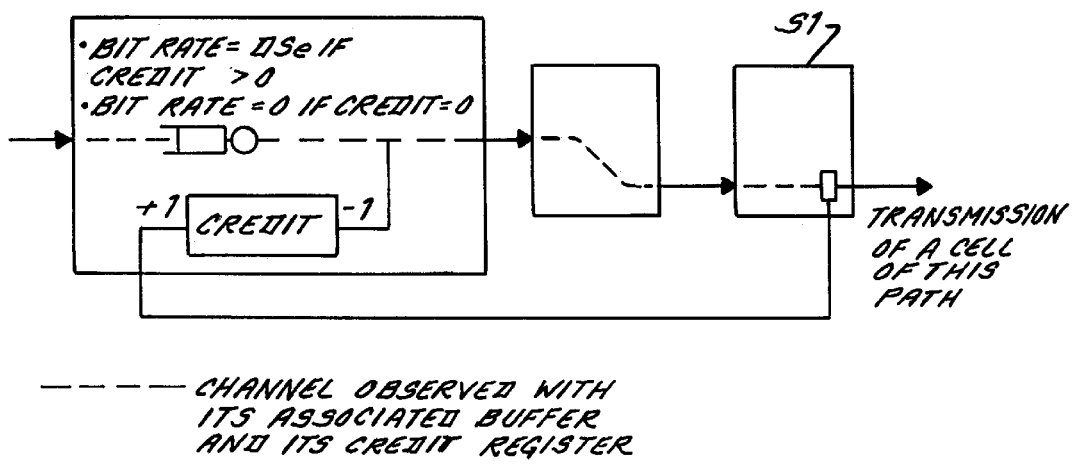
Figure 10:
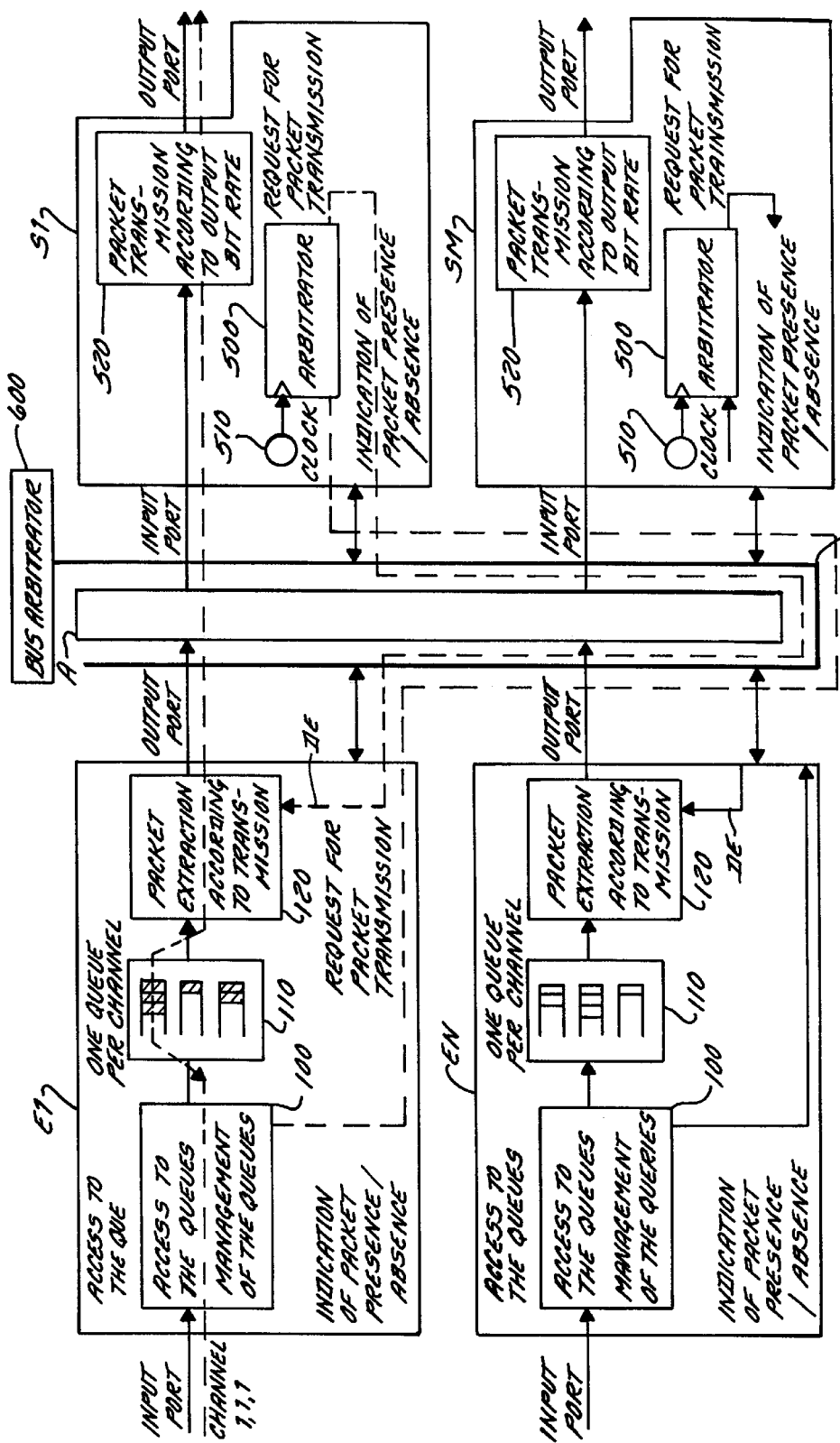
FIG. 10 shows the drawing of a regulation system according to the invention.

A description shall now be given of the overall operation of the switch by means of FIG. 10 which represents the different functional blocks provided by each of the constituent units of the switch.

Each input module E1–EN has a queue access and queue management set 100, a set of queues 110 and a set 120 for the extraction of the packets according to the transmission requests DE.

Each output module S1–SM has an arbitrator 500 driven by a clock 510 and a packet transmission set 520 for transmission according to the output bit rate.

In the illustration given by this figure, the routing device A obtains the passage of the information train flowing on the path 1,1,1 received at the input port of the module E1 by the output module S1.

According to the invention, in each input module, there are placed as many buffers as there are paths borne by these modules.

When a packet reaches the input link, it is placed in the queue associated with the path to which it belongs. This is done by means of the path identifier contained in the packet.

If the queue goes from the vacant state to the non-vacant state, an indication of the presence of the packet for this path is sent to a dialog bus BD between input modules and output modules, towards the output module which thus bears this path.

To this end, a context table that is proper to each module and is sent by the path identifier, makes it possible to find the number of the output module. If the queue of a path is not vacant at the arrival of a packet, it is not necessary to generate an indication of the presence of a packet.

Within the output module, the arrival of the indication of packet presence, through the dialog bus BD, permits the generation of transmission requests DE for this path.

The arbitrator 500 manages all the requests for transmission for the paths borne by the output card. The arbitrator 500 selects one request per period of time Ts (Ts is the working period of the arbitrator: DSs=1/Ts). This gives rise to a transmission request DE for the corresponding path, sent to the input card that bears it, through the dialog bus.

The input module processes the requests for transmission by order of arrival, at the rate Te (Te, working period of the input module: DSe=1/Te): the input module selects a transmission request, sends out a packet from the associated path to its output port and then destroys the transmission request. When a queue in the input module becomes vacant (after the transmission of the last packet that it contained), an indication of an absence of a packet for this path is sent, on the dialog bus BD between input modules and output modules, to the output module which also bears this path.

Within the output module, the arrival of the indication of packet absence prompts the elimination of the requests for transmission for the path (so long as there is no reception of the indication of packet presence for this path). Thus, the arbitrator in the output module no longer selects this path.

The dialog between input module and output module, as regards information elements other than the data trains, therefore does not go through the routing device but is done by means of a bus dedicated to this dialog that has been referenced BD.

Thus, on this bus, there flow the indications of packet presence or non-presence, going from the input modules to the output modules, and the transmission requests going from the output modules to the input modules. With each indication of packet presence or non-presence, or request for transmission, there is provided the identification of the path to which it corresponds and the identification of the card to which the information is sent.

The arbitrator 500 located in the output module provides for the regulation of the information trains belonging to the different paths borne by the output module.

The arbitrator works at the output bit rate of the output module.

At each period Ts (DSs=1/Ts), the arbitrator 500 chooses a path so that it sends out a packet from an input module. For this purpose, the arbitrator generates a request for transmission DE for this path and sends it by means of the dialog bus to the input module that bears the path.

The arbitrator 500 has knowledge of the state of the queues in the input modules (namely the presence or non-presence of packets in the queue). Indeed, an indication of packet presence or non-presence P/A is sent by an input module at each change in the state of a queue, to the output module that bears the associated channel (for each of the queues that is borne by the input module).

A description shall now be given of the way in which the management of the transmission request DE is done by the input module (functional block 120).

The input module receives transmission requests DE coming from different output modules through the dialog bus BD. The input module manages the transmission requests DE at the output bit rate of the input module.

At each period of time Te (DSe=1/Te), the module processes only one transmission request from among those received from the output modules and sends its output port a packet belonging to the path associated with the transmission request processed.

If several transmission requests coming from different output modules are received during one and the same period Te by the input module, they are placed in a processing queue during a period Te.

If, for reasons of time limit inherent to the internal functioning of the switch, a transmission request DE reaches an input module while this module has just sent an indication of packet non-presence for the associated path (i.e. its buffer has just been emptied), then the transmission request is destroyed as soon as it is received in the input card.

Apart from the set of functions just described, the switch has additional functions such as that of communication between switches.

Figure 11:
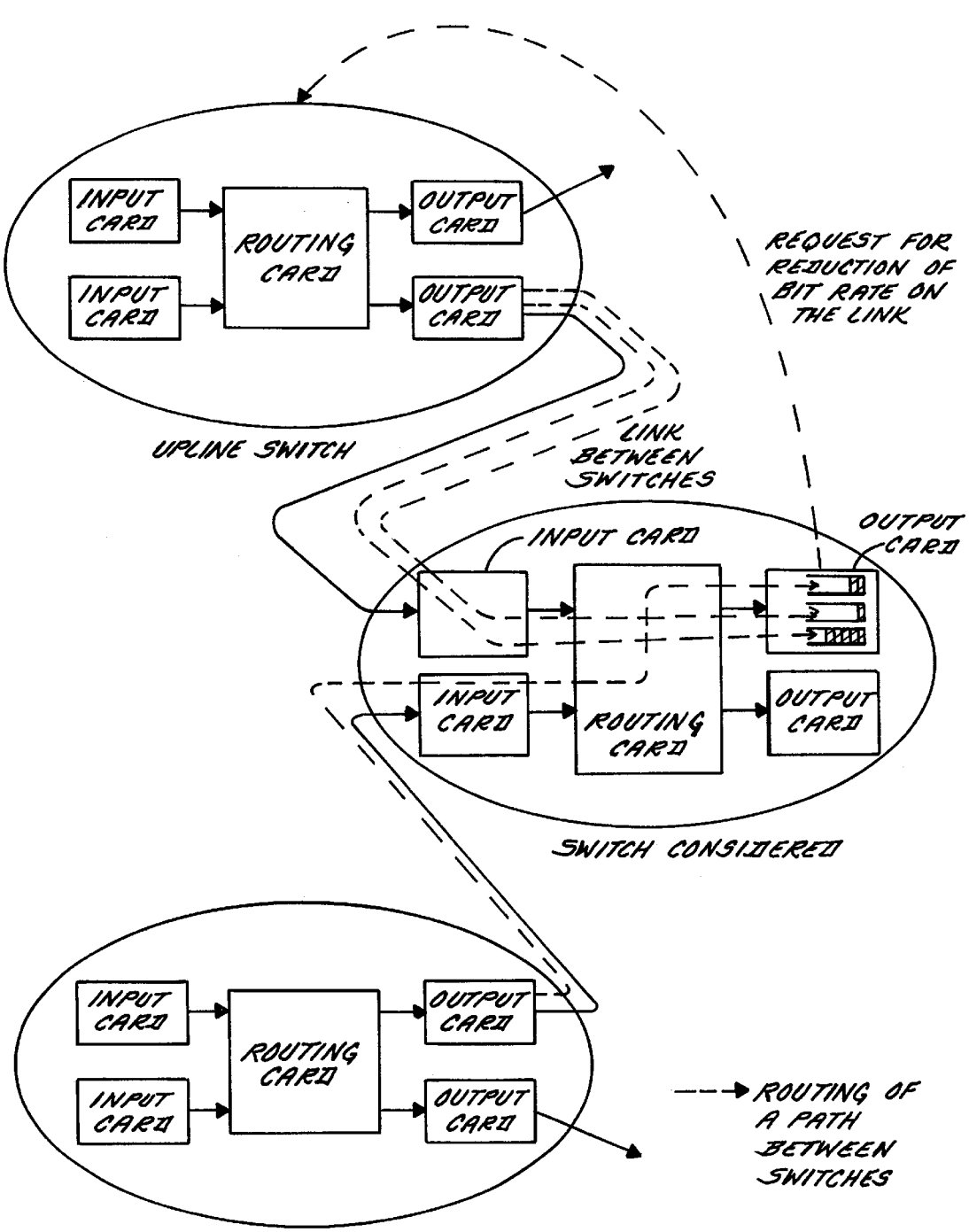
FIG. 11 shows the general drawing of a regulation system according to the prior art.

With an input module of the switch, there is associated an output module of the upline switch, as shown in FIG. 11. The switch observes its packet queues, and, as a function of their occupancy level, requests the upline switch to reduce or increase their bit rate.

Figure 12:
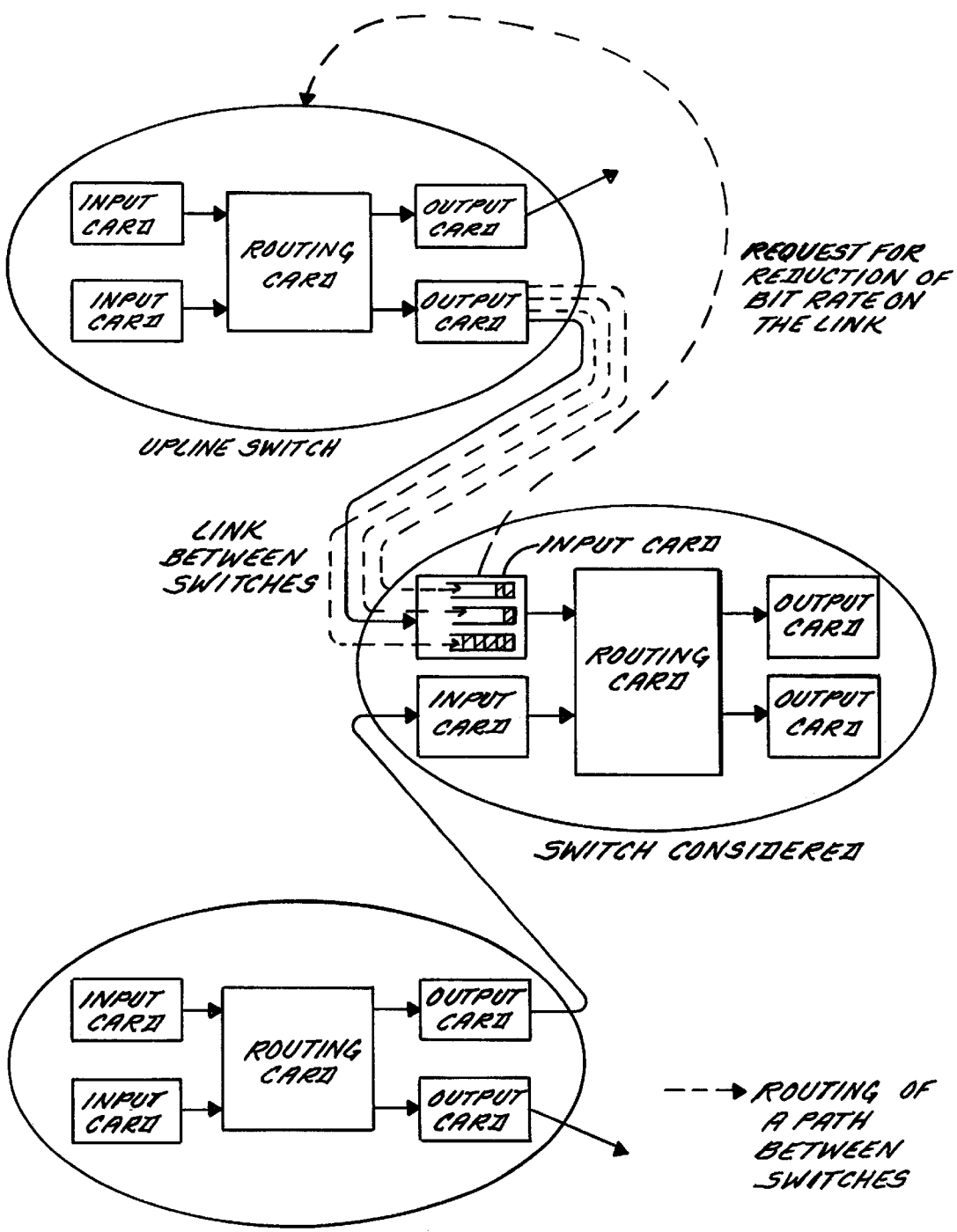
FIG. 12 shows the general drawing of a regulation system according to the invention.

For a clearer understanding of the contribution of the invention with respect to the prior art, we shall consider the two configurations illustrated by FIGS. 11 and 12, depending on whether the packet queues are placed in the output modules (according to the prior art) or input modules (according to the invention).

In the former configuration, an output module bears queues whose paths come from different switches. It is therefore necessary to carry out a reverse switching operation in order to determine the upline switch that bears the queues.

In the second configuration, which is that of the proposed invention, all the queues borne by one and the same input module come from one and the same upline switch.

It is therefore not necessary here to carry out a reverse switching operation. The information pertaining to a request for the reduction/increase of bit rate is sent directly to the switch associated with the input module. Then, the upline switch routes this information towards the concerned output module. The arbitrator takes account of it for the generation of requests.

The switch is also capable of implementing a preset rule of transmission on the output link.

In the description of the principle of the invention, neither the mode of operation of the arbitrator nor that of the generation of requests has been specified. This is to show that it is easy to implement different rules of transmission simply by playing on the mode of generation of requests and on the mode of selection of the requests.

Up until now, it has simply been specified that the generation of requests is based on information on packet presence/absence and that the arbitrator selects one request per period Ts, giving rise to a request for transmission DE.

Hereinafter, examples shall be given of particular rules of transmission on the output link:

a) the rule may be the sharing of the link in an equitable manner:
  arbitrator dealing with the requests of each of the paths in turn,
  generation of request upon indication of packet presence, b) the rule may be the sharing of the link in proportion to the bit rate of each path:
  arbitrator dealing with the requests of each of the paths in turn,
  the generation of requests: logic AND function between the clock stroke (corresponding to the bit rate of the path) and the indication of packet presence, c) the rule may be the combination of the transmission rules:
  the use of two arbitrators: one having priority with respect to the other,
  First arbitrator: it ensures a minimum bit rate for each path Dmg,
    arbitrator dealing with the requests Dmg of each of the paths in turn,
    generation of request Dmg: logic AND function between the clock stroke Dmg(i) (for the path No. i) and the indication of packet presence for the path,
  Second arbitrator: it enables the reallocation of the unused bit rate (in addition to the sum of the Dmg(s) of each path borne by the link),
    arbitrator dealing with the requests Dc of each of the paths in turn,
    generation of request Dc (for reallocation) on the indication of packet presence.

At each period of time Ts, if the first arbitrator has no request for selection, then the second arbitrator selects a request Dc.

The selection of a request gives rise directly to a request for transmission for the path associated with the request: if it is a request Dmg (or respectively a request Dc), a DE Dmg (or DE Dc respectively) is generated.

At an input module, the DE Dmg(s) will be processed on a priority basis at the DE Dc(s) whatever the paths that are associated with them.

In the case of the reception of a notification of congestion for a path i, there is no generation of request Dc for the path i so long as the situation of congestion occurs (the path i can be selected only by the first arbitrator). Thus, the path i is limited to the bit rate Dmg and does not participate in the reallocation.

It is this example of a rule of transmission that shall be used in the description of the management of requests for transmission made here below.

Figure 13:
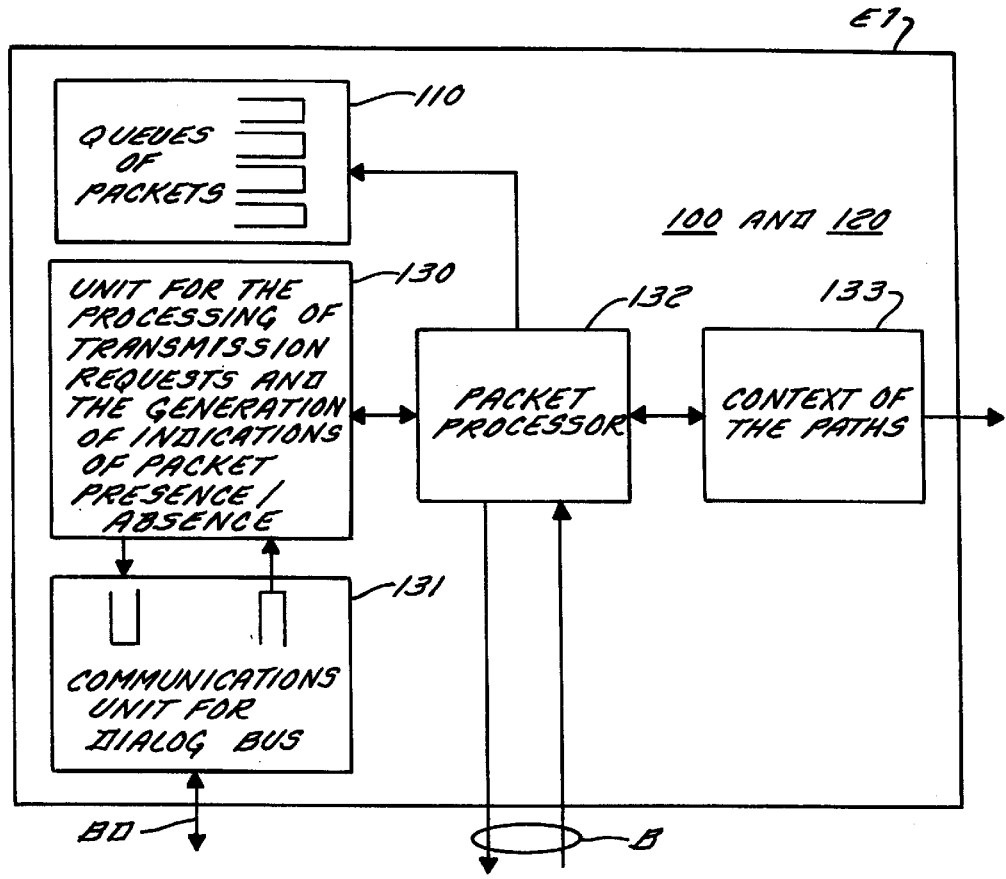
FIG. 13 shows a functional drawing of an input module.
Figure 14:
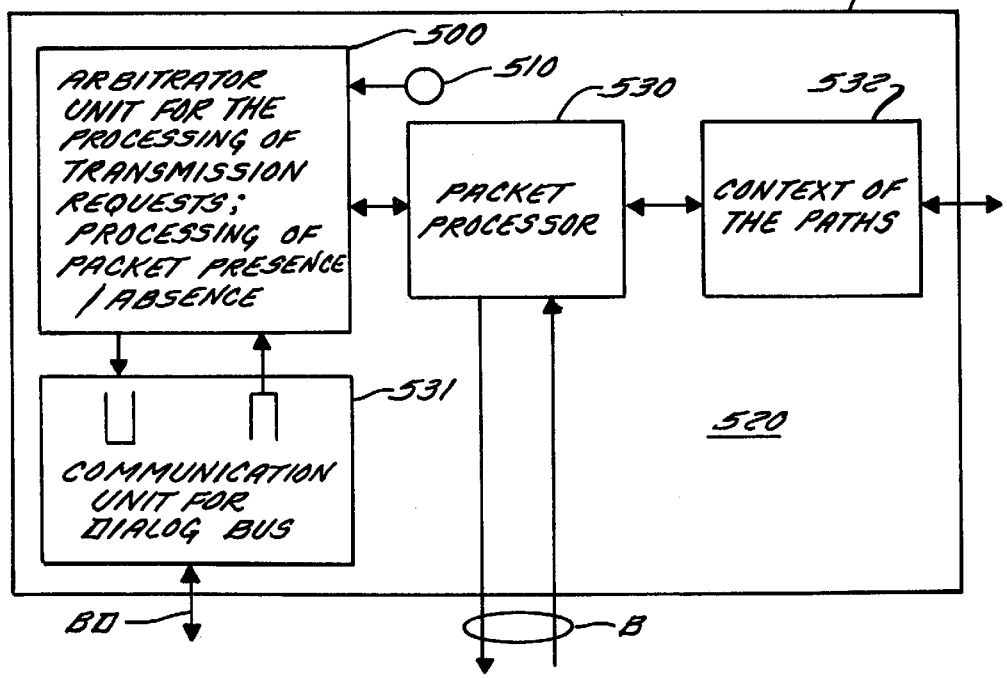
FIG. 14 shows the functional drawing of an output module.

A description shall now be given of the functional structure of the input and output modules with reference to FIGS. 13 and 14.

The input modules (E1, EN), FIG. 13 comprise, in addition to one queue per path 110 as stated, two functional sets:
  one queue access and queue management set 100, and
  one packet extraction set 120 responding to the transmission requests DE.

These functional sets are both set up by a packet processor 132 associated with a path context memory 133 and a transmission request processing unit 130 for the processing of transmission requests received through a unit 131 for communication with the dialog bus and for the generation of messages on the presence or absence of packets.

The processor 132 is connected to the routing device by the bus B used for the conveyance of the packets of each path that are waiting in the queues.

The output modules (S1, SN), FIG. 14, comprise an arbitrator 500 driven an internal clock 510 and a functional set for the transmission of packets (depending on the output bit rate of the module) organized around a packet processor 530. The packet processor is associated with a path context memory 532.

A unit 531 for communication with the dialog bus enables the reception of the indications of presence or absence of the packets and the sending of the transmission requests DE.

The processor 530 receives the packets from the routing device A by means of the bus B.

A description shall now be given here below of a particular mode of implementation. This description is given by way of an illustrative and non-restrictive example.

The description that follows therefore corresponds to a particular embodiment chosen by the Applicant corresponding to the following choices:
  a 16×16 matrix, therefore having 16 electronic cards at most,
  a maximum bit rate of 155 Mbits/s,
  the packets are 53-byte and 524-bit ATM cells,
  the base period To of the switch is equal to 2.74 µs corresponding to a flow rate of 155 Mbits/s with 424-bit ATM packets. This period To is the period with the greatest possible bit rate encountered in interfaces between cards and routing devices of the switch.

The "additional" bus, namely the dialog bus BD, is a two-way, point-to-multipoint bus shared by all the cards.

The management of the bus is done by means of a Motorola component, commercially distributed under the name of SPANCEIVER.

Figure 17:
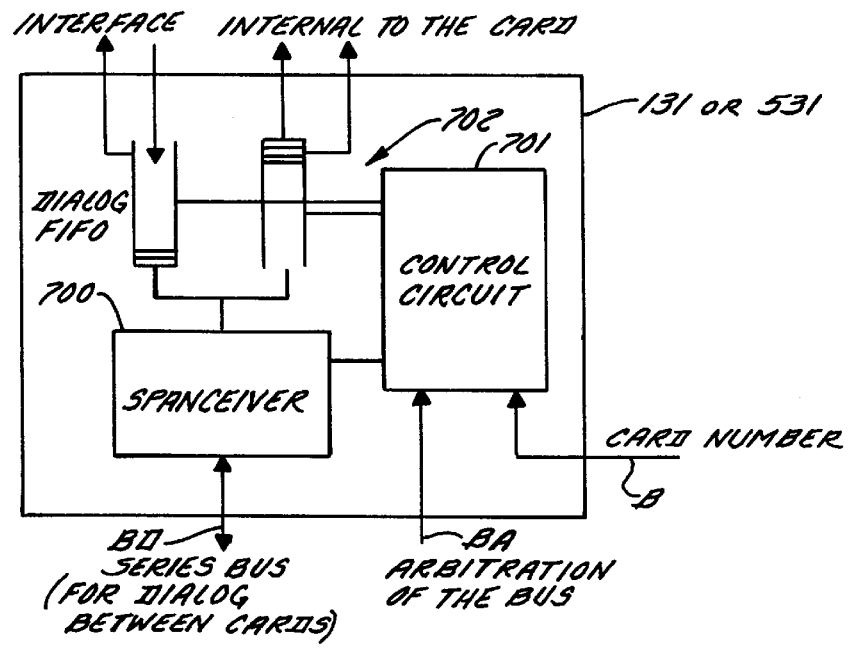
FIG. 17 shows the drawing of the communication unit.

The messages in each communications unit 131 or 531, sent out by this component, are constituted by three fields:
- a field encoding the number of the addressee card (4 bits),
- a field encoding the number of the path (12 bits),
- a field encoding the type of information (2 bits) to differentiate: the cases of presence of packets, the absences of packets, transmission requests DE Dmg, reallocation transmission requests DE Dc. These messages travel through this element by means of one of the stacks 702 (FIG. 17) according to the direction of the message (message received or message sent). The circuit 701 compares the signal BUSN <3 . . . 0> with the card number to activate the reading of a message in either of the stacks or not to activate it.

During a base period of the switch To, all the cards have available a time interval where they may send out two messages (which is sufficient for, at most, an input card needs to send, for each duration To, an indication of packet absence for one path and an indication of packet presence for another path; an output card has only one transmission request to be sent per To).

Figure 15:
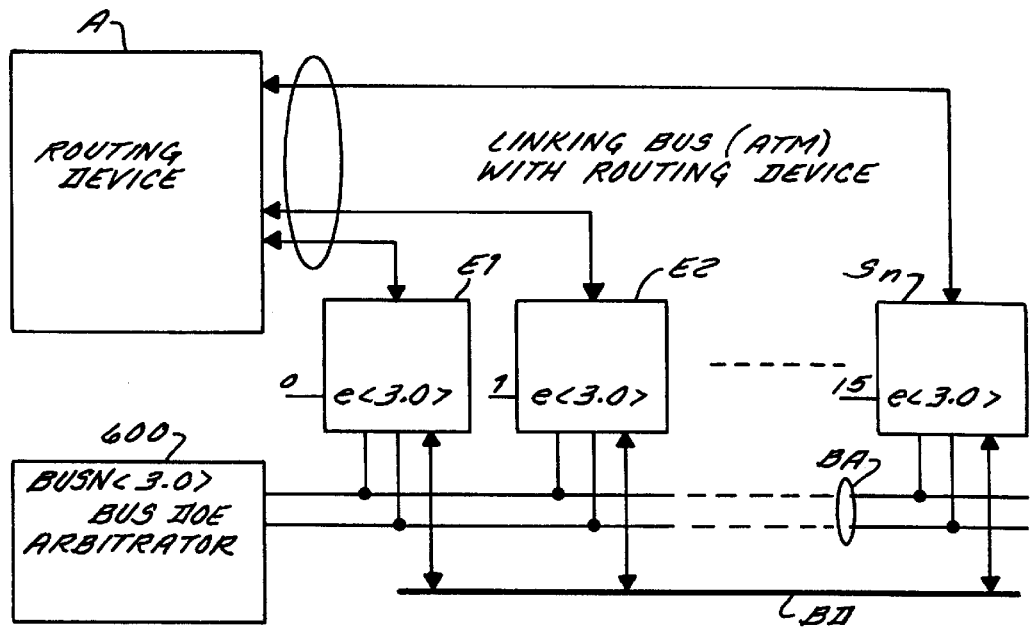
FIG. 15 shows the drawing of the links between modules and the routing device.

Referring to FIG. 15, the 16 locations liable to enter into dialog on this bus are numbered 0 to 15. The cards read their location on the pins of the connector of the signal ATM bus from the signals e<3 . . . 0>. All the cards receive the signals BUSN <3 . . . 0> and DOE.

Figure 16:
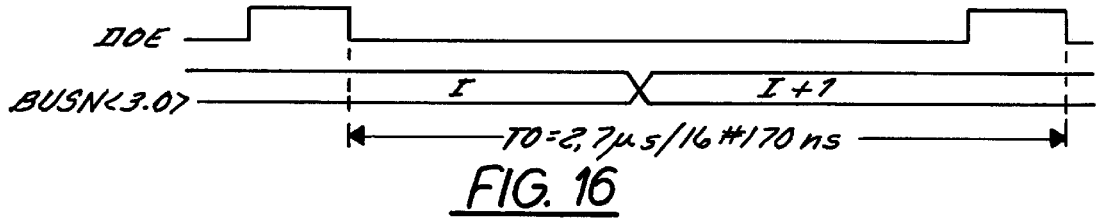
FIG. 16 shows the timing diagram of the signals DOE and BUSN <3 . . . 0>.

The arbitrator 600 is a generator of signals and generates the sequencing signals of the reading and writing operations BUSN <3 . . . 0> and DOE shown in the timing diagram of FIG. 16 that each card (or module) receives.

The rules of arbitration on the dialog bus between cards are as follows:
- A master card generates (arbitrator 600) the signals BUSN <3 . . . 0> and DOE in accordance with the timing diagrams of FIG. 16.
- The trailing edge of DOE marks the beginning of an arbitration and the comparison of BUSN <3 . . . 0> with the number of the card e<3 . . . 0>.
- A card is accepted for writing if BUSN <3 . . . 0>=e<3 . . . 0>.
- A card for which the bus is not available in writing mode is in a state of reading of the bus.
- When a card is a master card on the bus, it is entitled to transmit only two messages.

Figure 18:
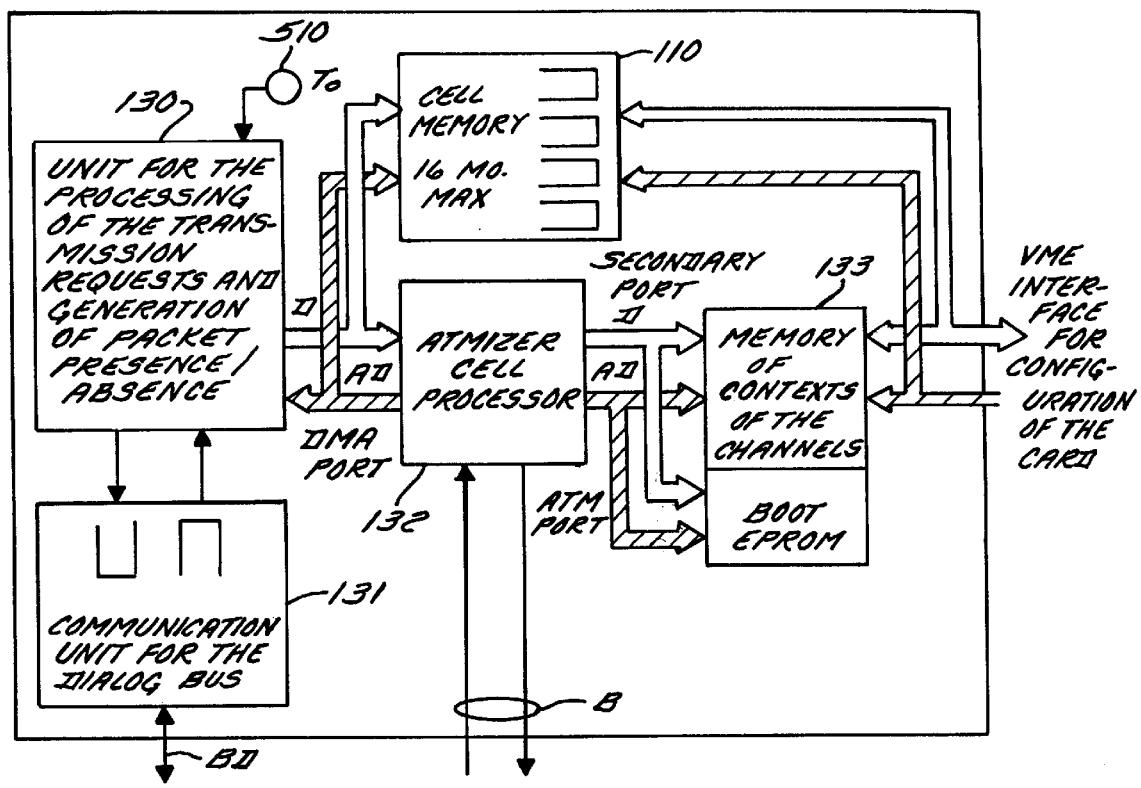
FIG. 18 shows the drawing for the making of an input card or module.
Figure 19:
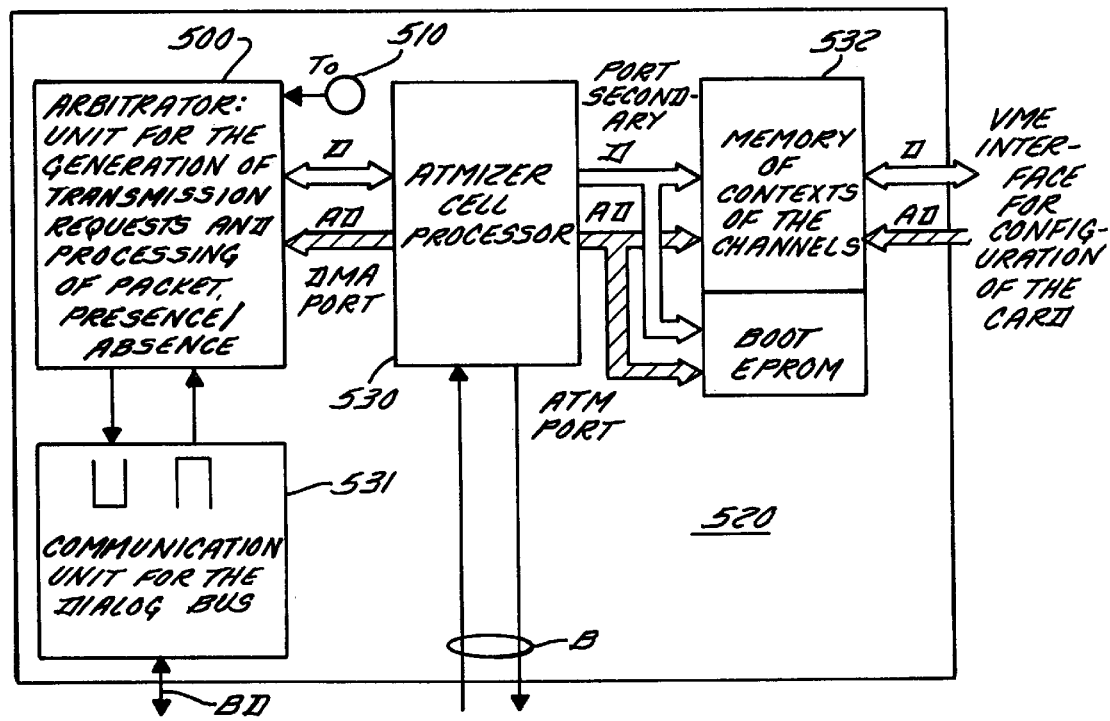
FIG. 19 shows the drawing for the making of an output card or module.

On an entirely exemplary basis, FIGS. 18 and 19 show the particular embodiment of the input cards and the output cards in the case of the processing of packets constituted by ATM cells.

The packet processors 132 or 530 are ATM cell processors commercially distributed under the name ATMIZER. The path context storage elements are non-volatile memories. Memories contain the BOOT program to boot the application. The processor is connected to this memory 133 (or 532) by an address and data bus through its secondary port. The processor is connected to the request processing unit DE130 or request generation unit DE500 (arbitrator) by its port DMA.

Each input or output card may be configured by means of an interface VME (not shown) using an address bus AD and data bus D.

In the case of the input cards, the interface VME accesses the context memory 133 and the cell memory 110 through these buses D and AD.

In the case of the output cards, the interface VME accesses the context memory 532 by these buses D and AD.

Figure 20:
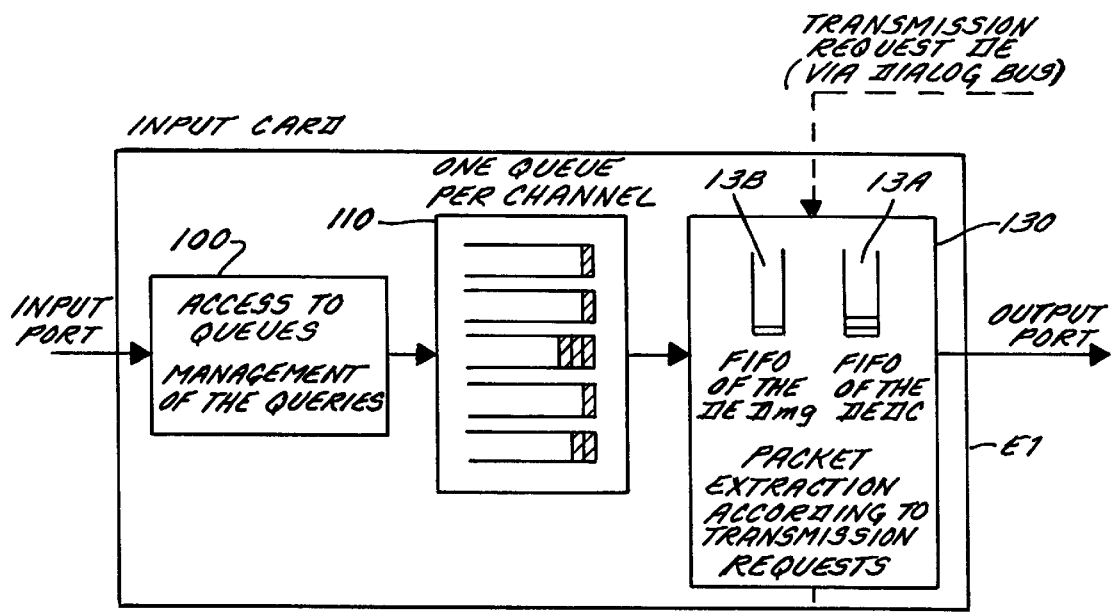
FIG. 20 shows a functional drawing of the management of transmission requests (DE)

FIG. 20 provides an illustration, according to these embodiments, of the management of the transmission requests DE. The element involved is the unit 130 for the processing of transmission requests and the generation of indications of the packet presence/absence. The purpose of the mechanism for the management of the DE is to cope with the simultaneous arrival on one and the same input card of several DE for different output cards.

Indeed, during one and the same system base period To, several output cards may each send a DE to one and the same input cards. Now, a single DE may be used by an input card for the base period of the system. Furthermore, the time limits for the transmission of the indications of packet absence/presence and DE, and the time needed for the arbitrator to take account of these information elements in an output card make it necessary to see to it that the number of DE for a path is not greater than the packets pending in its queue.

Two queues are used for this purpose per input card: one FIFO stack 13A for the reallocation transmission requests DE Dc and one FIFO stack 13B for the requests for transmission DE Dmg at the clock stroke Dmg.

The FIFO stack of the requests DE at the clock stroke Dmg (and respectively the queue of the DE Dc) is common to all the paths borne by the input card.

The processor has several counters associated with a path (and hence with a packet queue No. i):

CCI(i): cell counter (represents the number of cells really contained in the queue associated with the path) is used for the notification protocol and the management of the memory.

CPC(i): potential cell counter (represents the number of cells really contained in the queue associated with the path minus the total number of DE Dmg+DE Dc for this path).

CDC(i): counter of request for transmission at Dc for the path.

The following mechanism is implemented so that there are no unnecessary DE for the path i. The cells of the queue CPC are counted and one of them DE Dc is destroyed as soon as the total DE Dmg+DE Dc for the path has reached the number of cells in the queue associated with the path. So long as there are as many DE (DE Dmg and DE Dc without distinction) for a path as there are cells in its packet queue, any new DE Dc that is received is destroyed. If it is a DE Dmg, the principle consists of the replacement of a DE Dc (already received and not yet used) for the path by the DE Dmg that has just been received.

The DE Dmg have priority with respect to the DE Dc.

Figure 21:
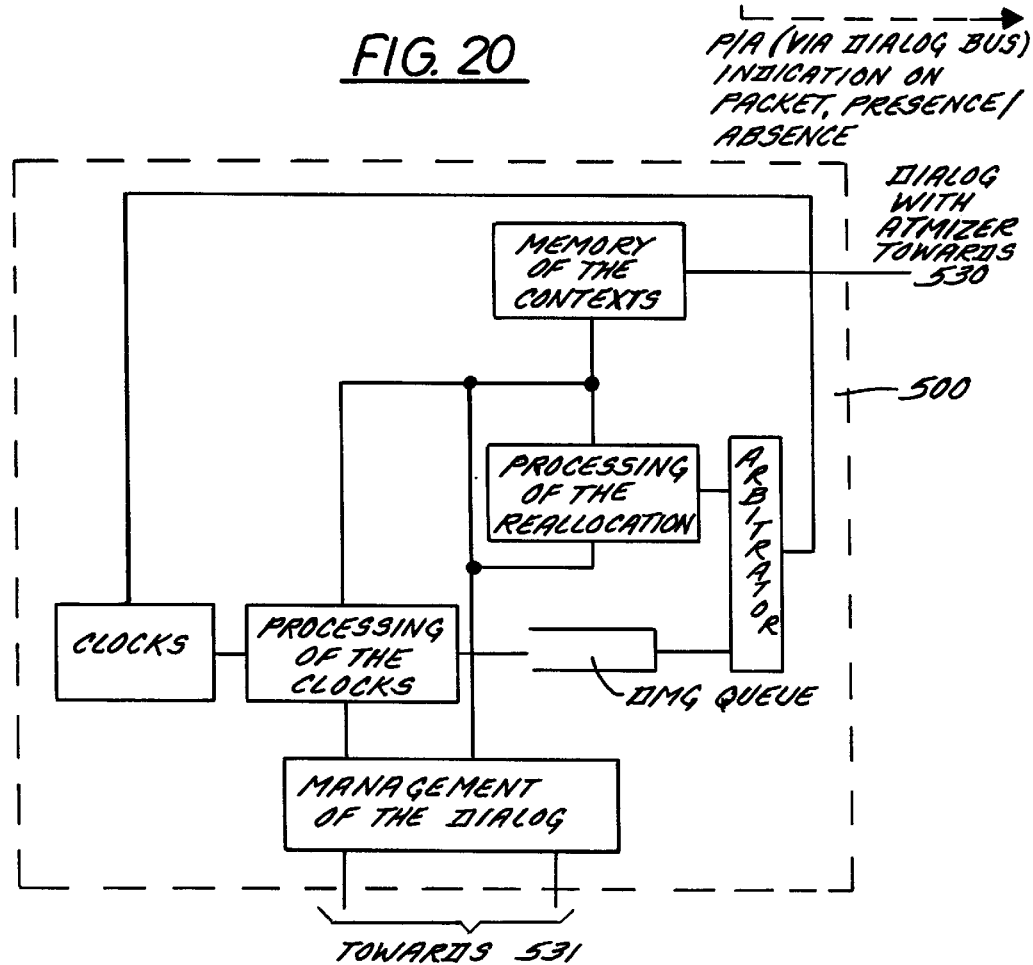
FIG. 21 shows the drawing for the making of an aribitrator in accordance with the present invention.

A more detailed description shall now be given of the making of the arbitrator 500 on the basis of the functional diagram shown in FIG. 21.

In practice, a first arbitrator deals with the DE Dmg requests and has a FIFO of the DE Dmg 501. A second arbitrator 502, in charge of the reallocation, implements a round of request DE Dc. It is formed by a table with a predefined number of slots. A slot is marked with a path number. When a slot is selected, if it is marked it gives rise to a DE Dc for this path.

For each path, the following information elements are contained in a path context memory 503:
* for the path No. i:
Pcell(i): indicates the presence of cells (presence of packets in the input card), HDmg(i): indicates that a clock stroke at Dmg has taken place while Pcell was at 0,
Marked_Slot(i): indicates that there is at least one marked slot in the reallocation round,
Reallocation(i): indicates that the reallocation is permitted,
e(i): shifting of the indicator in the reallocation round,
* overall variables:
I_Round: current index of reading in the reallocation round,
I_Found: a computation index for the reallocation round.

These different functions define the rules of arbitration implemented in each arbitration circuit 500 and are implemented by the algorithms reproduced in the following appendices:

APPENDIX 1 (page 28)
APPENDIX 2 (pages 29 and 30)

APPENDIX 1

Dmg clock processing algorithm

```
If clock stroke at Dmg
    do on all the paths having this Dmg
        if Pcell(i)
            push a DE(Dmg)i into FIFO Dmg
        else
            Hdmg(i) = 1
        end if
    end do
end if
Algorithm for the processing of an indication of PACKET
                    ABSENCE
Pcell(i) = 0
Algorithm for the processing of an indication of PACKET
                    PRESENCE Pcell(i) active
if Hdmg(i)
    insert a DE Dmg(i) into FIFO Dmg
    Hdmg(i) inactive
else
    if Slot_Marked(i) inactive and Reallocation active
        search for a vacant slot after I_Round+e(i)
(that is I_Found)
            Marking of the slot I_Found
            Slot_Marked(i) active
    end if
end if
```

APPENDIX 2

Algorithm for processing at the transmission of a DE

```
All the Ts
If FIFO Dmg not vacant
    draw a DE Dmg from the FIFO Dmg and transmit it
else
    Do so long as there is the time and so long as
there has not been found any slot marked with an active
Pcell and active Reallocation:
        find the next marked slot after I_Round, that
is I_Found
        if slot marked
            unmark the slot I_Found
            I_Round = I_Found (updating of I_round)
            If Pcell (I_found) active and
Reallocation (I_found) active
                transmit a DE Fc (I_Found)
                search for a vacant slot after
I_Round+e(i) (namely I_Found)
                    mark the slot I_found
                    stop doing
            else
                Slot_Marked(i) = 0
            end if
        end if
```

APPENDIX 2-continued

```
        end do
    end if
        Algorithm for the processing at the reception of the
                    notifications of congestion if change of mode (congestion/decongestion) on the path
i
    if passage into congestion mode
        Reallocation(i) inactive
        if Slot_Marked(i) active
            find the marked slot and unmark it
            Slot_Marked(i) inactive
        end if
    else    (passage into decongestion)
        Reallocation(i) active
        if Slot_Marked(i) inactive
            search for a vacant slot after
I_Round+e(i) (giving I_Found)
            mark the slot I_found with No. i
            Slot_Marked(i) active
        end if
    end if
end if
```

What is claimed is:

1. A system for the regulation of information trains for a packet switch, the information trains including a plurality of packets, the switch comprising:

a plurality of input modules, each input module being connected to an input link including a transport channel, said transport channel including a plurality of paths, wherein each path is associated with one of the information trains and has a corresponding bit rate, and wherein the packets of different ones of the information trains form an interlacing;

a plurality of output modules wherein each of said paths is associated with one of said output modules;

a routing module interposed between said input modules and said output modules to route at least one of the information trains flowing on a first one of said paths from a corresponding one of said input modules towards said output module associated with said first path, according to a preset rule;

wherein (1) each said input module includes a plurality of queues, each said queue associated with only one of said paths, and wherein said input modules are each adapted to generate a signal indicative of packet presence when one of said packets is input to a corresponding one of said queues, and (2) each said output module is associated with a corresponding arbitrator that generates a signal indicative of a packet transmission request in response to one of said packet presence signals, wherein said input modules are responsive to said packet transmission request signals to transmit corresponding ones of said packets to said output modules, according to said preset rule; and wherein each said arbitrator monitors each said bit rate of said paths associated with the output module associated with that arbitrator and, according to a rule of arbitration taking account of these bit rates, dynamically controls the bit rate of at least one of said associated paths by causing the input module associated with that path to generate and transmit a bit rate control request signal to an upline switch associated with the associated input module.

2. A system of regulation according to claim 1, wherein each said arbitrator is disposed in said associated output module.

3. A system of regulation according to claim 2, wherein each said input module comprises an associated queue access and management unit that generates a corresponding one of said packet presence signals and transmits said packet presence signal to said output module associated with a corresponding one of said queues.

4. A system of regulation according to claim 2, further including a dialog bus to exchange signals between said input modules and said output modules, and wherein said dialog bus directly interconnects said input modules to said output modules.

5. A system of regulation according to claim 4, wherein each said input module further comprises (a) a queue access and management unit that is adapted to generate and transmit one of said packet presence signals, and (b) a packet extraction unit that transmits said packet corresponding to said packet presence signal in response to one of said packet transmission request signals.

6. A system of regulation according to claim 5, wherein said queue access and management unit and said packet extraction unit are implemented with (a) a packet processor associated with a context memory that correlates each packet with a path indicator, and (b) a processing unit to process said packet transmission request signal and to generate said packet presence signal.

7. A system of regulation according to claim 6, wherein said processing unit includes a reception device that (1) receives said packet transmission request signals from different ones of said output modules and processes one of said packet transmission request signals at said bit rate of a corresponding one of said paths, and (2) transmits a corresponding one of said packets to said output module corresponding to said packet transmission request signal.

8. A system of regulation according to claim 6, wherein said queue access and management unit and said packet extraction unit are further implemented with a communications unit that communicates with said dialog bus to (1) store said packet transmission request signals, and (2) keep said packet presence signals in a pending state so long as said dialog bus is not available.

9. A system of regulation according to claim 8, wherein said communications unit comprises (a) a processor to manage said dialog bus, (b) two stacks, one of which receives said transmission request signals from said packet output modules while the other receives said packet presence signals, and (c) a control circuit that determines if said dialog bus is available.

10. A system of regulation according to claim 8, further comprising a bus arbitrator of said dialog bus that provides signal sequencing for the reading and writing operations on said dialog bus.

11. A system of regulation according to claim 1, wherein each said output module has a packet processor associated with a context memory that correlates each packet with a path indicator.

12. A system of regulation according to claim 11, wherein each said output module comprises an output communications unit to communicate with a dialog bus so as to cause said dialog bus to memorize said packet presence signals and keep said packet transmission request signals addressed to different ones of said input modules in a pending state so long as said dialog bus is not available.

13. A system of regulation according to claim 12, wherein said output communications unit has (a) two stacks, one of which stores said packet presence signals while the other stores said packet transmission request signals, and (b) a control circuit that determines if said dialog bus is available.

14. A system of regulation according to claim 1, wherein one of said input modules of the switch requests an upline switch associated with that input module to reduce said bit rate of one of said paths associated with that input module in response to a congestion condition of said associated path.

15. A system of regulation according to claim 1, wherein said preset rule is characterized by considering said transmission requests of each said path in turn.

16. A system of regulation according to claim 15, wherein said preset rule is further characterized by selecting and transmitting transmission request signals based on an indication of packet presence and the bit rate of said path associated with said indication of packet presence.

17. A system of regulation of information trains for a packet switch according to a preset rule, each information train including a plurality of packets, the system comprising:

a plurality of input modules each having an input link that includes a plurality of paths, each path being associated with a corresponding one of the information trains and has a corresponding bit rate;

a plurality of queues associated with each input module, each queue for storing the packets of only a corresponding one of said paths;

a plurality of output modules each having an arbitrator, wherein each one of said paths is associated with a corresponding one of said output modules;

a routing module interposed between said input modules and said output modules to route at least one of said information trains traversing a corresponding one of said paths from a corresponding one of said input modules towards said output module associated with said corresponding path; and wherein each said input module generates a signal indicative of packet presence when a first one of said packets is input to a corresponding one of said queues, and wherein one of said arbitrators associated with said corresponding queue generates a signal indicative of a packet transmission request in response to said packet presence signal and transmits said packet transmission request signal towards said input module having said corresponding queue, said input module having said corresponding queue being responsive to said packet transmission request signal to transmit said first packet to said output module having said arbitrator associated with said corresponding queue, according to the preset rule, and wherein a first one of said input modules generates and transmits a bit rate control request signal to an upline switch associated with said first input module to dynamically control the bit rate of one of said paths associated with said first input module.

18. A system of regulation according to claim 17, further including a dialog bus that directly interconnects said input modules and said output modules to exchange said packet presence signals and said transmission request signals between said input modules and said output modules.

19. A method of regulation of information trains for a packet switch according to a preset rule, each information train including a plurality of packets, the method comprising the steps of:

providing a plurality of input modules each having an input link that includes a plurality of paths, each path being associated with a corresponding one of the information trains and has a corresponding bit rate;

providing a plurality of output modules each having an arbitrator, wherein each one of said paths is associated with a corresponding one of said output modules;

storing the packets with a plurality of queues associated with each input module, each queue corresponding to one of said paths;

routing at least one of said information trains traversing a corresponding one of said paths from a corresponding one of said input modules towards said output module associated with said corresponding path with a routing module interposed between said input modules and said output modules;

generating a signal indicative of packet presence when a first one of said packets is input to a corresponding one of said queues;

generating, with one of said arbitrators associated with said corresponding queue, a signal indicative of a packet transmission request in response to said packet presence signal;

transmitting said packet transmission request signal towards said input module having said corresponding queue, said input module having said corresponding queue being responsive to said packet transmission request signal to transmit said first packet to said output module having said arbitrator associated with said corresponding queue, according to the preset rule; and generating and transmitting, with a first one of said input modules, a bit rate control request signal to an upline switch associated with said first input module to dynamically control the bit rate of one of said paths associated with said first input module.

* * * * *